United States Patent
Chen

(10) Patent No.: US 8,327,163 B2
(45) Date of Patent: Dec. 4, 2012

(54) APPARATUS AND METHODS FOR PROGRAMMABLE POWER-UP SEQUENCE

(75) Inventor: Shi-Hao Chen, Nantou (TW)

(73) Assignees: Taiwan Semiconductor Manufacturing Company, Ltd., Hsin-Chu (TW); Global Unichip Corp., Hsinchu (TW)

( * ) Notice: Subject to any disclaimer, the term of this patent is extended or adjusted under 35 U.S.C. 154(b) by 429 days.

(21) Appl. No.: 12/617,572

(22) Filed: Nov. 12, 2009

(65) Prior Publication Data

US 2010/0219866 A1 Sep. 2, 2010

Related U.S. Application Data

(60) Provisional application No. 61/156,210, filed on Feb. 27, 2009.

(51) Int. Cl.
*G06F 1/00* (2006.01)
(52) U.S. Cl. ..................................... 713/300
(58) Field of Classification Search ............. 713/300
See application file for complete search history.

(56) References Cited

U.S. PATENT DOCUMENTS

| 7,904,736 B2 * | 3/2011 | You et al. ............... 713/300 |
| 8,024,591 B2 * | 9/2011 | Bertelsen et al. ......... 713/323 |
| 2008/0270813 A1 * | 10/2008 | Yang et al. ............ 713/323 |

OTHER PUBLICATIONS

Shi, K., et al., "A Wakeup Rush Current and Charge-up Time Analysis Method for Programmable Power-Gating Designs", SOC Conference, 2007 IEEE International, Sep. 26-29, 2007, pp. 163-165.

* cited by examiner

*Primary Examiner* — Mohammed Rehman
(74) *Attorney, Agent, or Firm* — Slater & Matsil, L.L.P.

(57) ABSTRACT

Circuits and methods for providing control of a power up sequence for supplying a gated power supply to a circuit portion. A power switch fabric is provided having more than two chains with more than two bits of control. The chains include power switches that are sequentially enabled in response to control signal to supply a virtual power supply to a gated circuit to support power gating. The power switches may include daughter switches and mother switches, where the mother switches are enabled later in time than the daughter switches. The enable signals to allow the virtual power supply to begin powering up may be timed to control the ramp up time, in rush current and peak current during the power up sequence of the virtual power supply. Methods for providing timing for the daughter and mother switches and enables to multiple chains in a power switch fabric are disclosed.

19 Claims, 10 Drawing Sheets

US 8,327,163 B2

APPARATUS AND METHODS FOR PROGRAMMABLE POWER-UP SEQUENCE

This application claims the benefit of U.S. Provisional Application No. 61/156,210 filed on Feb. 27, 2009, entitled "Apparatus and Methods for Programmable Power-Up Sequence," which application is hereby incorporated herein by reference.

TECHNICAL FIELD

The present invention relates to a circuit and methods for providing an improved integrated circuit design and methods integrated circuits using a programmable and controllable power up sequence for portions of an integrated circuit that are supplied with a gated power supply. The use of a gated power supply to portions of a System on a Chip (SOC) or other integrated circuit reduces power consumption due to leakage losses. Powering up circuitry can have various problems including dynamic IR drop, in-rush current and other problems than can lead to power loss or improper chip operation. The embodiments of the present invention provide advantages in powering up circuitry having a gated power supply on an integrated circuit.

BACKGROUND

Presently, the increasing trend of the use of integrated circuitry in portable and other battery powered devices increases the need for power consumption reduction in advanced integrated circuits. Some power reduction can be achieved by reducing power to portions of a circuit when they are inactive. The consumption of dynamic power by clocked circuitry can be reduced, for example, by gating the clock to portions of an integrated circuit, for example an ASIC or SOC that has multiple design blocks, by gating or halting a clock to that portion. However, even when the switching power due to the action of the clock signal is not consumed, static power loss due to leakage current and standby current will still occur. The use of power gating to remove the power supply to portions of an ASIC or SOC is therefore increasing, as a method to further reduce power consumption by inactive circuitry.

FIG. 1 depicts a block diagram of an integrated circuit 11, which may be for example an ASIC, or SOC, comprising design blocks V1, V2 and V3. Several approaches known in the prior art for gating power to certain blocks are depicted in FIG. 1. For example, power switch 13, which may be internally or externally controlled, gates power to a design block V3. A switchable power pad 15 controls the supply of power to another design block V2. An off chip power regulator implemented as a switchable voltage regulator 19 is shown, depicting another known approach.

FIG. 2 depicts in a simple circuit diagram an on-chip power gating circuit for an ARM circuit function of the prior art. A fixed supply VDD_SOC, for example 1.2 Volts, is provided on a conductor. A second supply VDD_CORE, which may the same or somewhat lower than VDD_SOC, is provided on a second conductor. Some portions of the circuitry are coupled in a fixed voltage manner to one or the other of these power supply conductors, for example RAM 31 is coupled to voltage supply VDD_CORE. A CPU SOC 35 is similarly coupled to the higher voltage supply VDD_SOC. A third circuit portion, CORE 33, has a dynamic voltage supply (DVS) which is turned on and off based on some periods of circuit inactivity. This phenomenon is often referred to as a "sleep" cycle. PMOS transistors 37 are shown coupled in a serial fashion to a control signal labeled "Sleep". When the PMOS transistors are cut off, (Sleep is a logical high value, as PMOS transistors 37 are turned on when the gate terminal falls below VDD), that is −Vgs is greater than a threshold voltage, the power supplied to the CORE 33 is gated off. When the Sleep control line falls, for example to a logical zero value, the CPRE 33 circuitry receives a voltage supply input.

As shown in FIG. 2, the PMOS transistors are serially coupled and when the last transistor 37 receives the Sleep signal, acknowledge signal (ACK) indicates all of the transistors are active, or, inactive. In this manner the system can monitor when all of the VDD_CORE_VDDV portions are coupled to VDD_CORE.

Prior art power gating circuits may implement a sequence for powering up blocks. In FIG. 3, for example, the VDD supply is coupled to a grid of conductors 21 that provide a VDD voltage to a plurality of locations, perhaps in an ASIC or SOC device. For example in a multiple level metal semiconductor device, power rails 21 may be comprised of copper or aluminum metallization and may be routed as a grid of conductors across the device. The gating PMOS transistors 25 in FIG. 3 provide a gated supply voltage VDD_G to a second group of conductors 23, which then supply power to the gated circuit blocks 29.

In FIG. 3, dashed line 27 indicates a sequence for turning on the PMOS gating transistors to control the power up sequence. This is done to control the current as the circuitry is powered on.

The power on process has a peak current during the time the gated power supply conductors are being raised to VDD. Once that voltage is established across the device, current flowing drops. The more current that is allowed to flow at once, the faster the ramp up time from 0V or a discharged state to VDD, or a charged state, will be. FIG. 4 depicts an exemplary current vs. voltage graph for the current Ids flowing through a PMOS "header" transistor that is coupled between a VDD supply and a gated VDD supply and provides the power to a portion of a gated power supply circuit. At time "1" in the diagram, the transistor is cut off and no current flows. As the gate voltage falls below VDD (turning on the PMOS as the voltage Vgs falls) the transistor turns on and is in saturation at time 2, in other words further decreases in the gate voltage do not provide additional current flow. As the current being supplied from the VDD supply to the gated VDD line falls, as the VDD line rises towards the higher rail, the transistor current falls and the transistor is now in a steady state situation in the linear, or resistive region with a smaller current, nearly zero, flowing through it. (Vds is small as the drain rises to nearly the source voltage).

FIG. 5 depicts three curves for the ramp up time of a VDD gated voltage supply using three different approaches. In a "fish bone" approach where multiple PMOS transistors are turned on to simultaneously couple all of the portions of the circuit supplied by the gated voltage at once, as shown in the solid line, the current peaks very early but the VDD voltage from the gating circuitry reaches the VDD level fairly early. Thus the concurrence approach has a short ramp-up time. An alternative approach, as represented by the line with dashes interspersed with a single dot and labeled "mutation (domino) ", the transistors are turned on in groups in a domino fashion, and the current reaches smaller peak value, however the VDD ramp up time is longer. Finally, in the third approach, represented in the graphs by the line that is dashes interspersed with two dots between them, labeled "one by one (daisy chain)", the current peaks at a smaller value; as each portion of the gated circuit is coupled to the supply voltage one at a time in serial fashion, however the VDD ramp up time is the longest. The graphs of voltage and current in the figure illustrate a design trade-off between current and ramp up time. The more current that is allowed to flow at the peak, the faster the gated VDD voltage will ramp up to VDD.

A problem with the power switches and routing fabric of the prior art, for example for the design of ASIC or SOC devices, is the power fabric and switch placement and topology is typically fixed. For some designs implemented using the switch placement and routing fabric will have characteristics that make the power on process work well. However, if the same power switch placement and routing topology is used for another device implemented in the same design flow, the placement and power on sequence used may not be optimal for that second device. For example in FIG. 6. device A has a good fit to the power switch fabric, while for the device labeled B, the power switch fabric is not suitable, Thus, there is a continuing need for improved methods and structures to address these and other problems with the power switch cells and routing of the prior art as used in advanced semiconductor processes to implement SOCs.

SUMMARY OF THE INVENTION

These and other problems are generally solved or circumvented, and technical advantages are generally achieved, by embodiments of the present invention, which provides a switched power fabric to supply circuitry with a gated power supply responsive to a control signal.

In a first exemplary embodiment of the invention, a plurality of chains is disposed on an integrated circuit to form a power fabric. Power switches are placed along the chains and couple a power supply, such as a fixed supply voltage, to the power fabric which may supply the circuit with a gated or "virtual" supply voltage. The power switches are sequentially coupled to two or more enable signals that may be provided by a control circuit at different times. By timing the enable signals and by placing the power switches in certain places along the chains, the ramp up time to power up the switched power fabric, the in-rush current, the peak current and other characteristics of the power up process may be controlled. Design tools used during the integrated circuit design may be used to determine these characteristics so the power fabric can be optimized for a particular circuit. By gating off circuitry when it is not needed using the switched power fabric, power loss due to leakage current and standby power consumption may be reduced substantially.

In yet another embodiment, a daughter switch is provided for each of the chains in a switched power fabric for providing a virtual power supply to a portion of an integrated circuit. A mother switch is provided also coupled to provide the virtual power supply and associated with the daughter switch. The mother switch is enabled only after a time period following the enable signal to the daughter switch, by selecting this time period additional control over the current and ramp up time for the virtual power supply is obtained.

In yet another exemplary embodiment, a daughter switch is provided for each of the chains in a switched power fabric for providing a virtual power supply to a portion of an integrated circuit. A mother switch is provided also coupled to provide the virtual power supply and associated with the daughter switch. The mother switch is enabled only after the daughter switch is enabled and after the virtual power supply reaches a predetermined voltage level, such as the virtual power supply level as an example. By selecting this voltage level additional control over the current and ramp up time for the virtual power supply is obtained.

The foregoing has outlined rather broadly the features and technical advantages of the present invention in order that the detailed description of the invention that follows may be better understood. This summary section briefly describes certain exemplary embodiments of the invention but the invention is not limited only to these exemplary embodiments.

Additional features and advantages of the invention will be described hereinafter, which form the subject of the claims of the invention. It should be appreciated by those skilled in the art that the conception and specific embodiment disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

The drawings, schematics and diagrams are illustrative, not intended to be limiting but are examples of embodiments of the invention, are simplified for explanatory purposes, and are not drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
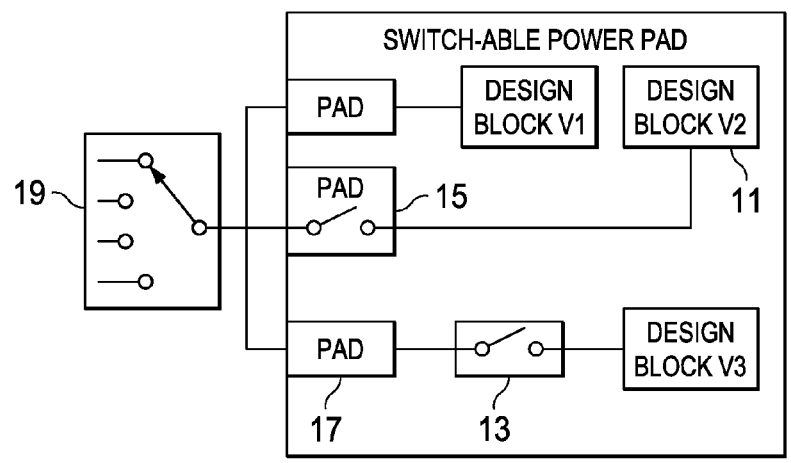
FIG. 1 illustrates a block diagram of a prior art SOC with power switches illustrated on chip, and off chip.
Figure 2:
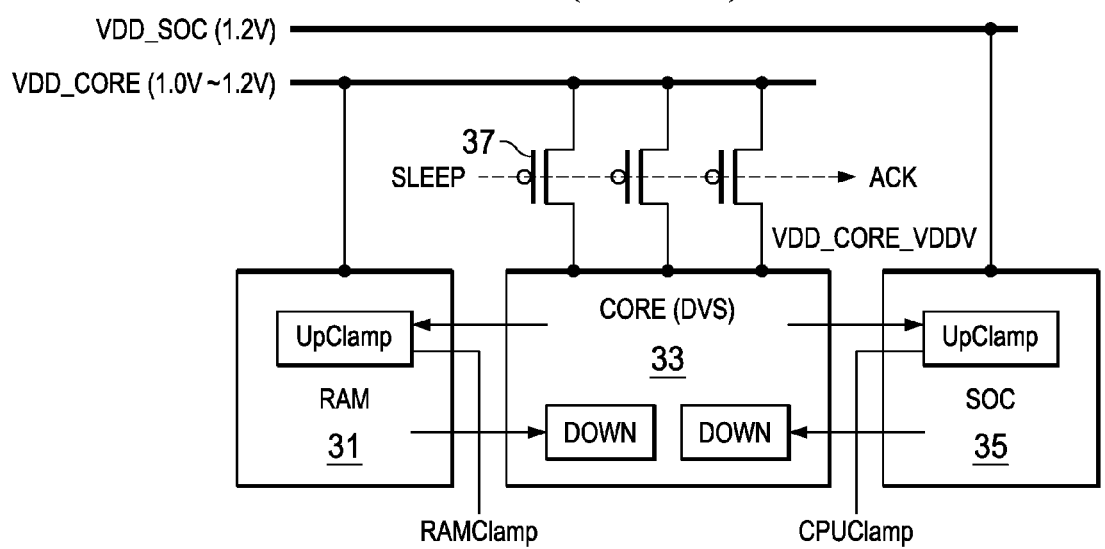
FIG. 2 illustrates in a simple block diagram a portion of a prior art circuit having on chip power gating switches.
Figure 3:
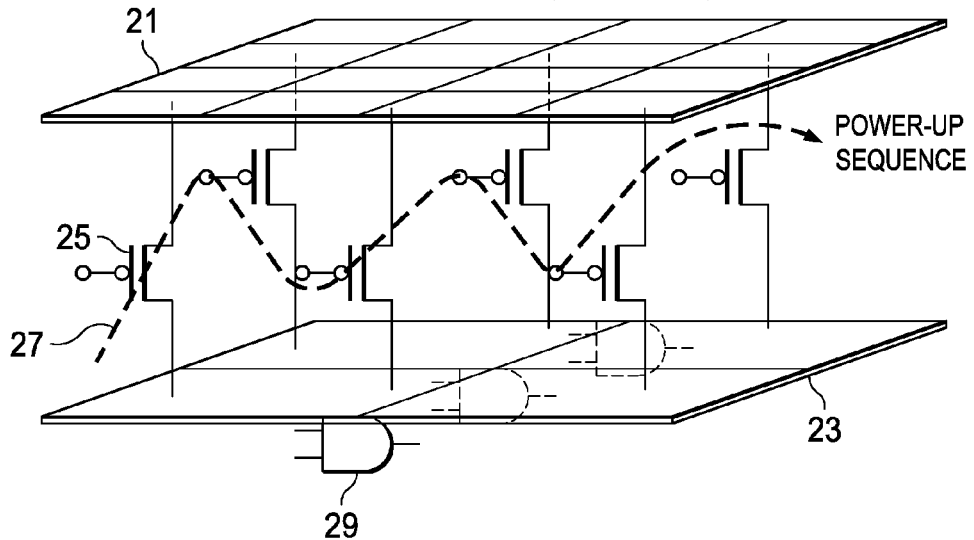
FIG. 3 illustrates in a simplified diagram a power switch fabric for gating a VDD supply to certain blocks in a circuit.
Figure 4:
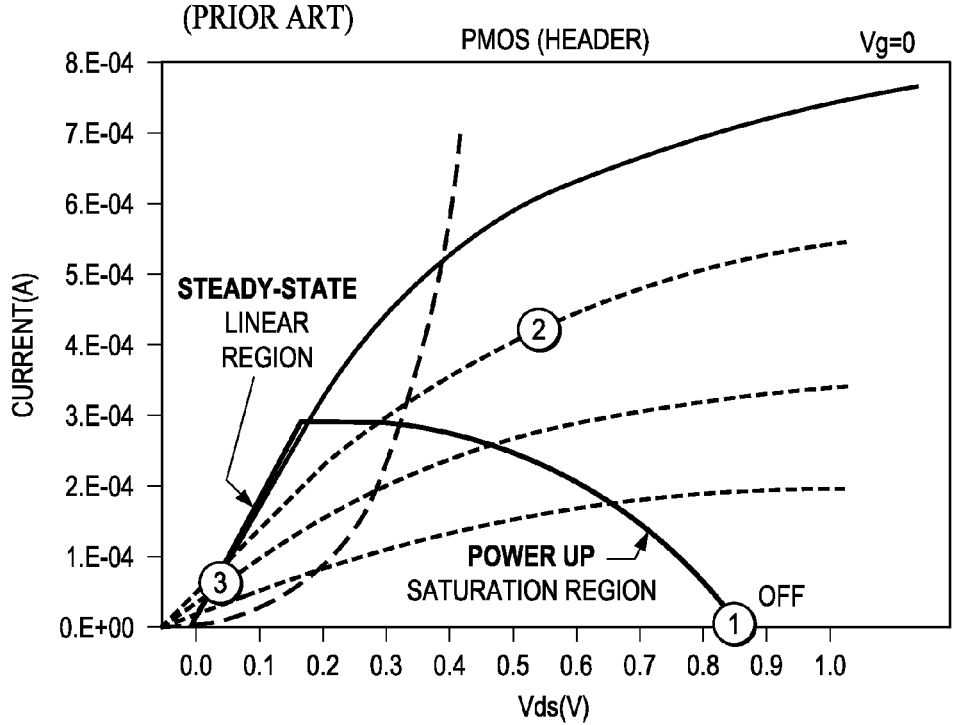
FIG. 4 illustrates a current-voltage characteristic of a PMOS transistor with the associated load curve during power ramp up.
Figure 5:
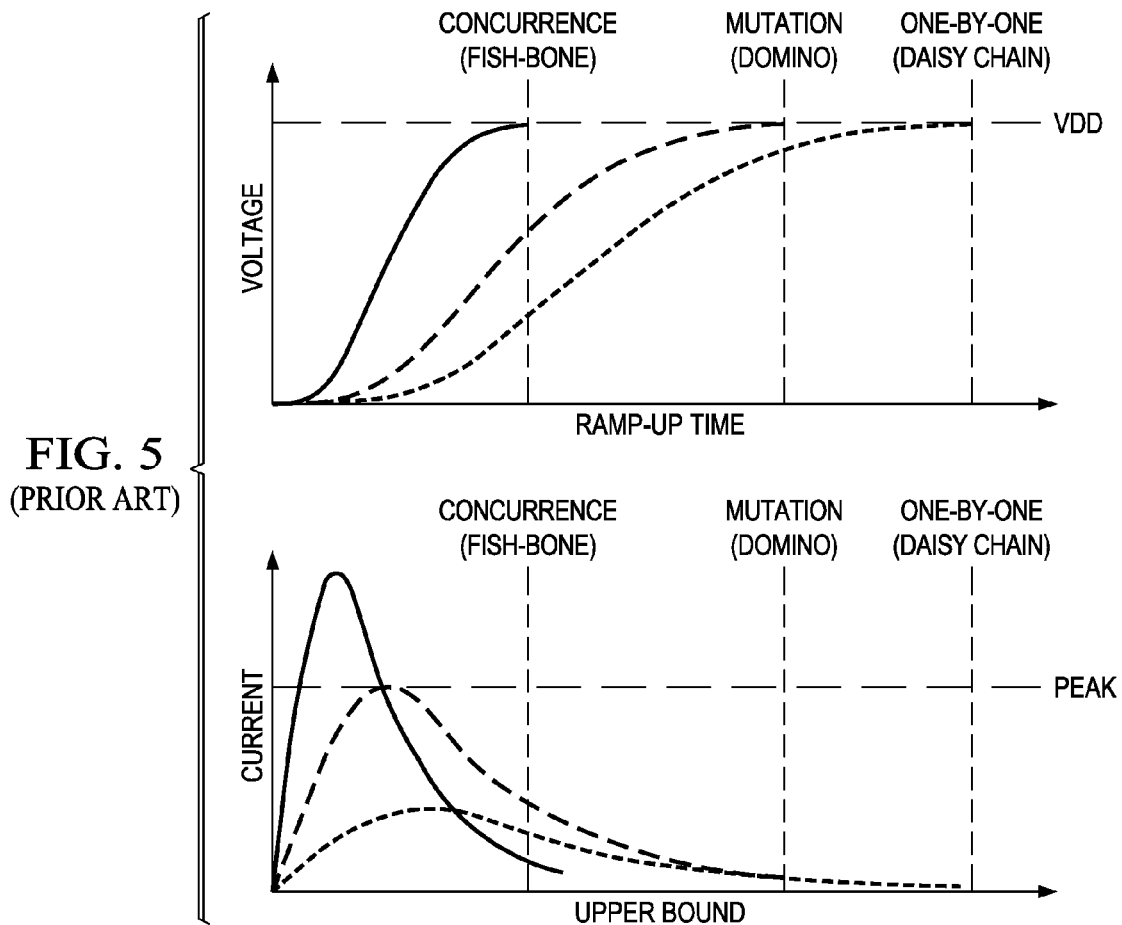
FIG. 5 illustrates a current and voltage timing diagram for a power on sequence where a power switch fabric ramps to a VDD level.
Figure 6:
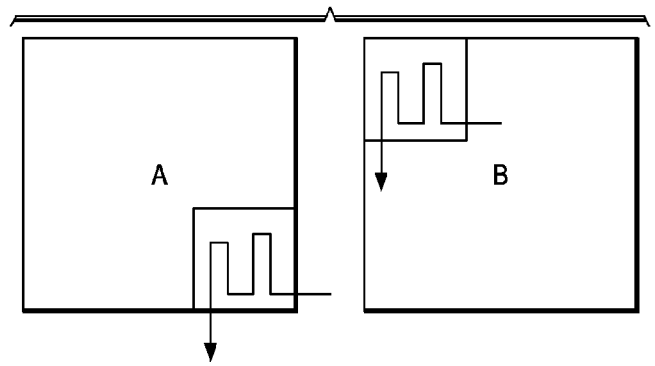
FIG. 6 illustrates a fixed power switch topology of the prior art applied to two different integrated circuit designs.
Figure 7A:
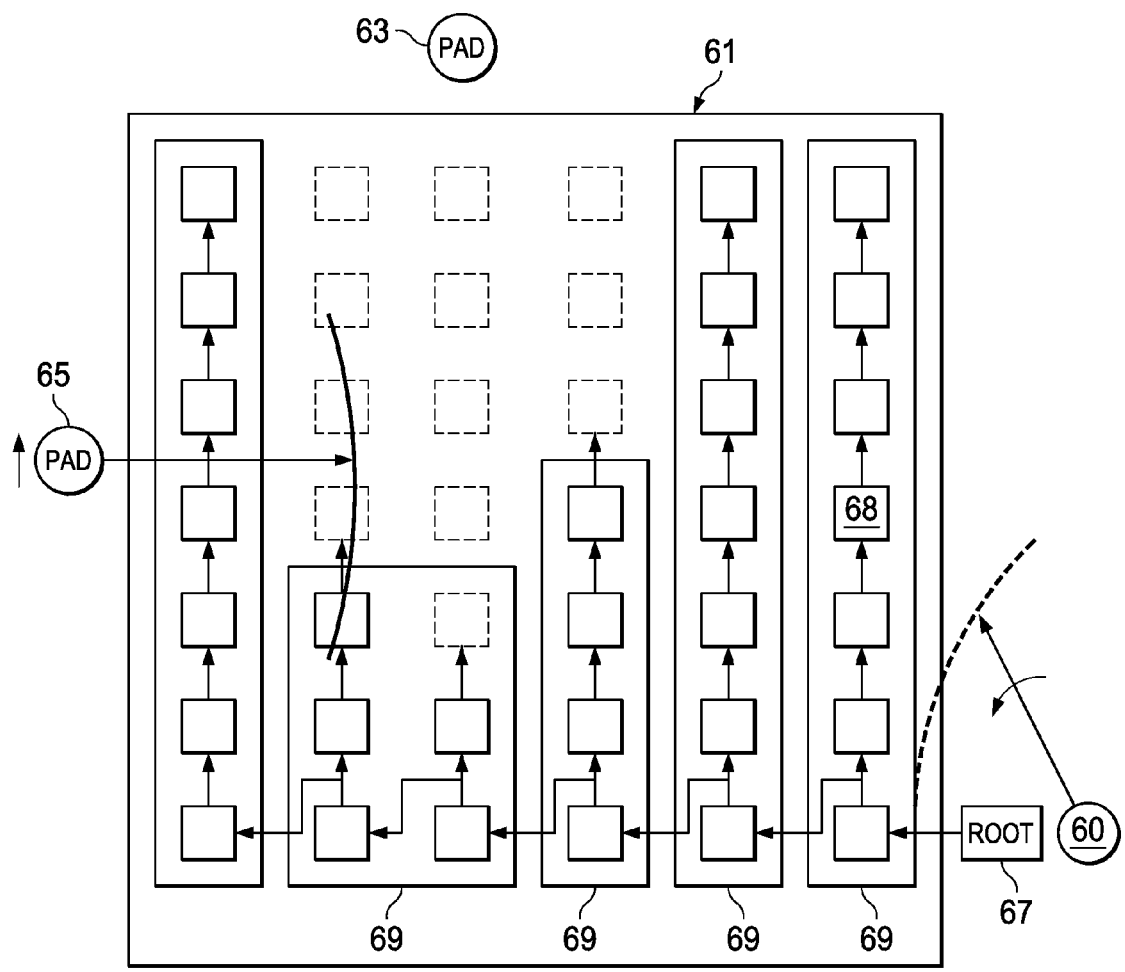
FIG. 7(a) illustrates in a block diagram an exemplary embodiment a layout view of an integrated circuit with a power switch fabric for distributing a gated voltage supply to a circuit portion.
Figure 7B:
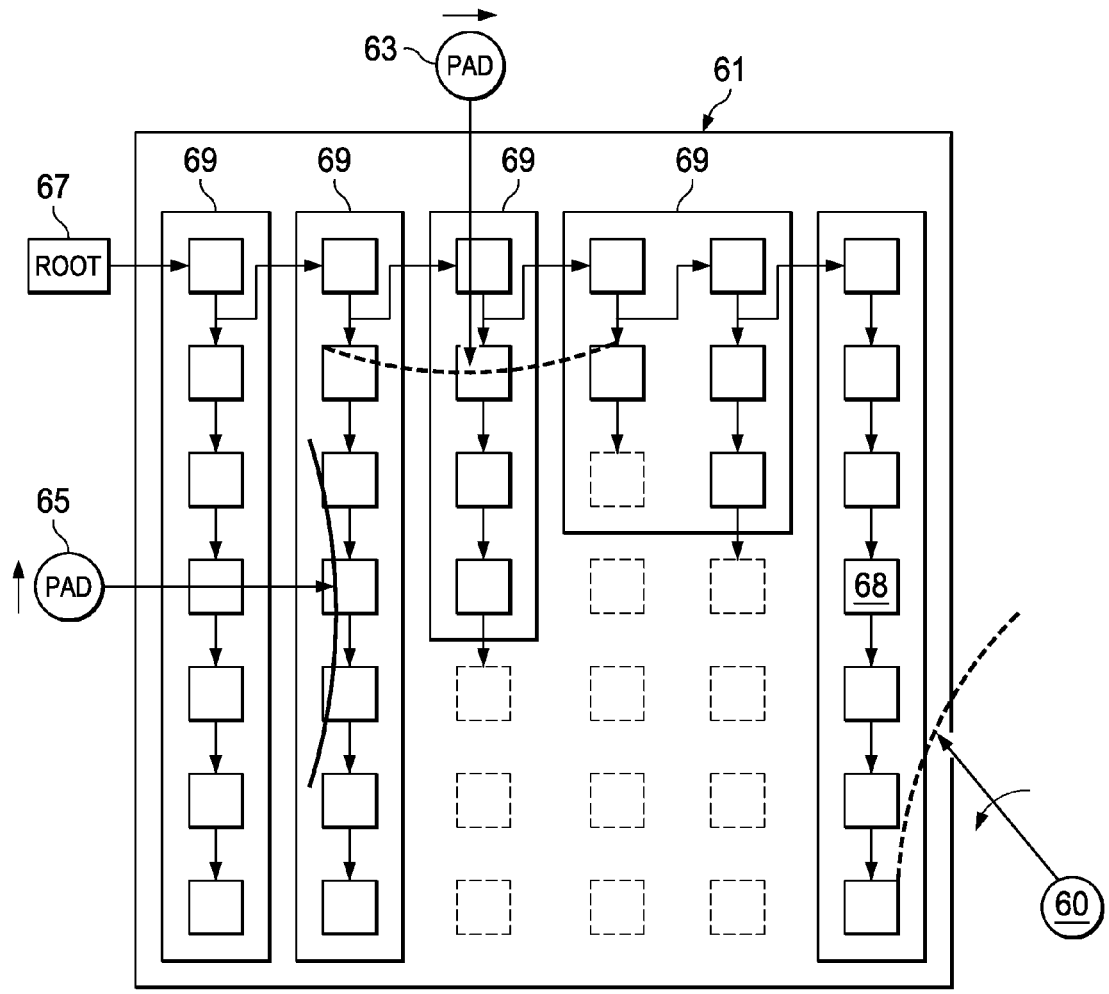
FIG. 7(b) illustrates in a block diagram another exemplary embodiment in a layout view of an integrated circuit with a power switch fabric for distributing a gated voltage supply to a circuit portion.

FIG. 7(*a*) and FIG. 7(*b*) illustrate in block diagrams the use of a heuristic approach to a power fabric in a circuit embodiment. In FIG. 7(*a*) circuit 61 may be an SOC or a circuit block, or blocks that form a portion of an SOC. Chains 69 distributing a virtual VDD supply, for example, are shown with power distribution points 68 from a root circuit 67. The root location starts the power up process, that is the root supplies a true VDD supply or a fixed voltage supply to the power switch fabric, and switch fabric devices that are physically close to the root will begin raising the virtual VDD conductors to VDD first as the power is turned on. The virtual supply may be supplied at about the same voltage as the VDD or other voltage level being supplied by the fixed voltage. Alternatively, the virtual supply may be a lower voltage level, as is known in the art.

FIG. 7(*a*) depicts a plurality of power fabric chains 69 that distribute the gated virtual VDD voltage supply using power switches 68, which are turned on sequentially as shown by the arrows in FIG. 7(*a*). The figure depicts a possible increase in the supply of supply current in areas far from the root location by suggesting adding additional power pads 63, 65 to increase the weight of the power supply in those areas, while the weighting of the area near the root is decreased according to the function 60, which corresponds to the IR degradation. This heuristic approach compensates for the IR degradation that occurs as the power is supplied across the circuitry. If instead a virtual VDD were provided without some approach to addressing the IR drop during a turn on sequence, the virtual VDD level may drop below the desired level as the current is supplied to more loads.

FIG. 7(*a*) depicts a heuristic method to determine a desired power-up sequence to prevent dynamic IR (voltage drop). The power up sequence optimization can be described as a function subject to factors, including without limitation power consumption, power source location, root position, core IR degradation and the like. Power switches are partitioned/clustered, weighted and stitched with using heuristics to prevent the dynamic IR. Preferably this method is performed during placement stage. By giving a ramp-up time constraint, the maximum depth of the power switch configuration may be determined. Most, or all of the power switch cells should be partitioned and clustered into several banks in order to satisfy, or closely approach, the ramp-up time specification. After confirming the switch fabric partition, the next step is to assemble/stitch the power switch cells and make sure the power-up sequence can meet the constraint of maximum concurrence. Although the embodiments are not limited to any particular placement, it may be better to place the enable signal of a power-down domain near the power source and far away from related power-on domain, as shown in FIG. 7(*b*))

FIG. 7(*b*) illustrates in another block diagram the heuristic approach to a power fabric in a circuit embodiment. In FIG. 7(*b*), the circuit 61, which may be an SOC or a circuit block or blocks that form a portion of an SOC. Chains 69 distributing a virtual VDD supply, for example, are shown with power distribution points 68 from a root circuit 67. The root location has been changed from the embodiment in FIG. 7(*a*). The root location starts the power up process, that is the root supplies a true VDD supply or a fixed voltage supply to the power switch fabric, and switch fabric devices that are physically close to the root will begin raising the virtual VDD conductors to VDD first as the power is turned on. The virtual supply may be supplied at about the same voltage as the VDD or other voltage level being supplied by the fixed voltage. Alternatively, the virtual supply may be a lower voltage level, as is known in the art.

In FIG. 7(*b*) the arc shaped lines coupled to pads 65 and 63 indicate areas on the SOC where additional current (increased weight) are needed to reach the desired ramp-up time. The area coupled to the function 60, which corresponds to the expected IR degradation, shows a need for decreased weight in that area. The embodiments provide controls for increasing and decreasing weight by placing switch chains, and by controlling turn on times, of various switch elements.

A consideration of many factors, including the root location (the location where the true or fixed VDD power is first applied to the power gating fabric), the virtual voltage supply ramp up time, the routing topology, and the size and number of power switches, is needed to supply the "power on" current to supply the virtual VDD voltage, while mitigating IR drop, in-rush current and while controlling the peak current. Embodiments of the present invention provide advantages in addressing these many considerations.

Figure 8:
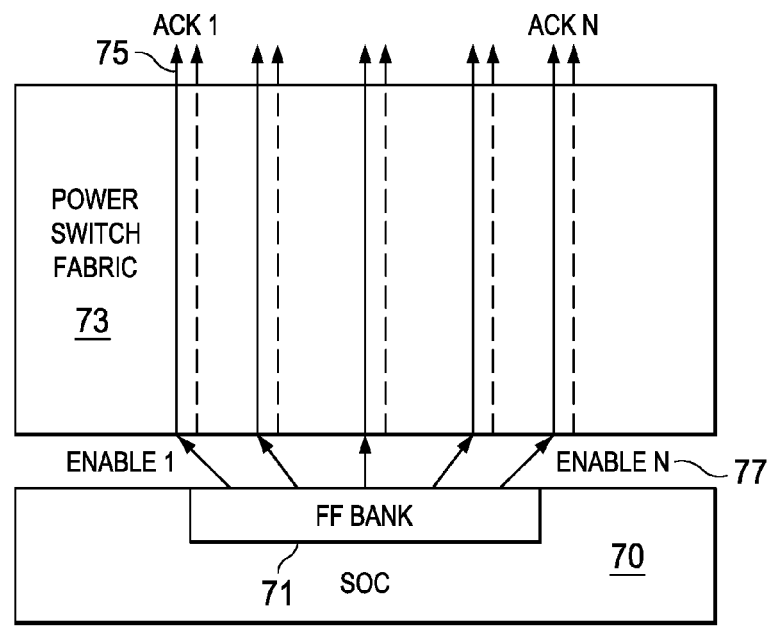
FIG. 8 depicts in an exemplary embodiment of the present invention a cross sectional view of an SOC with a register for enabling the power switch fabric that is shown in a plan view.

In an example implementation, a preferred embodiment switch fabric is depicted in FIG. 8. SOC or ASIC 70 is depicted at the bottom of the figure in a cross section, with a flip flop or register bank 71 providing enable signals. The power switch fabric 73 used to provide a virtual voltage supply to portions of the SOC using N chains is illustrated above the cross section. Although the embodiments are not limited to this example implementation, in the illustrative embodiment each power fabric chain has a daughter switch sequence and a mother switch sequence, the daughter chains are shown as a solid line, and the mother chains are shown as dashed lines. As used in this application, a "daughter" switch is a smaller transistor with smaller driving strength which may be operated, for example, in the saturation region, as further described below. A "mother" switch is a larger transistor with larger drive strength. In some embodiments the mother switches may be operated in the linear region, to decrease current loading. Further, in some embodiments some timing control or delay may be used to activate the mother switches only after a virtual supply has reached a nominal level above a threshold. In alternative embodiments the switch chains may only embody single switches, and the mother-daughter arrangement is not required, nor are the embodiments so limited. When the enable signal reaches the end of any one of the chains, an acknowledge (Ack) signal may be obtained indicating that the chain or sequence is intact and that the enable signal has reached all the power switches in the sequence.

As will be further described, in the exemplary embodiment presented here the mother switches associated with a daughter chain are turned on at a time following the turn on of the corresponding daughter switches, to provide additional control of the ramp up time and current on the power supply fabric. The use of the chains with N bits of the register bank each allows control of the power up sequence, control of the ramp up time, mitigation of the in rush current and IR drop problems, and control of the peak current during a power up sequence. The number and placement of root circuits is also used to further control the power up sequence. The number and placement of power switches, such as PMOS switches, as both mother and daughter switches is also performed using layout placement tools and IR analysis tools during the design of the SOC. The topology for the power switch fabric is therefore optimized for the actual load on the power switches during a power up sequence.

Figure 9:
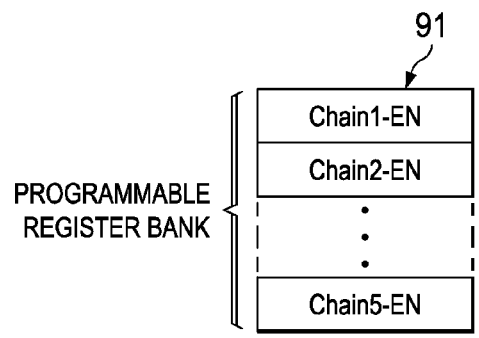
FIG. 9 depicts in a block diagram a control register for use with the embodiments.

FIG. 9 depicts a block diagram of a register bank for providing the enable signals in FIG. 8. By providing the enable signals at certain times, additional control may be provided in the ramp up time, in rush current, and peak current for the power up sequence.

Figure 10:
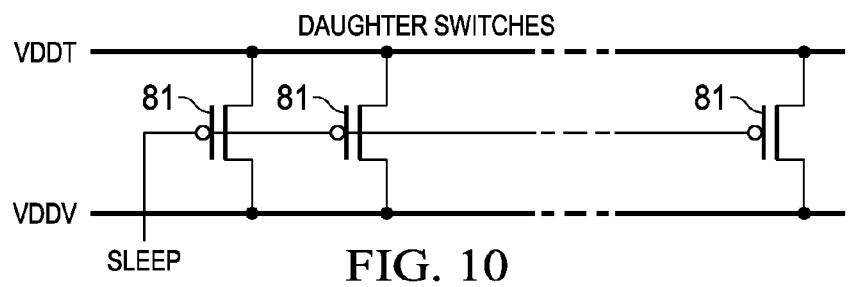
FIG. 10 depicts in a simple circuit diagram of another exemplary embodiment a plurality of N switches for providing a virtual VDD supply responsive to a Sleep control signal.

FIG. 10 depicts another exemplary embodiment for providing power to a chain of N daughter switches using a single bit of control, input signal Sleep is received for example from a control register, and switches 81 couple a true or fixed VDD voltage VDDT to the virtual power supply VDDV when the Sleep input is inactive. When the input Sleep rises to a logical high voltage, the PMOS switches then turn off, allowing the conductors carrying VDDV to discharge. Alternatively, as is known to those skilled in the art, other circuitry such as pass gates, or NMOS transistors, may be used to couple VDD voltage VDDT to VDDV.

Figure 11:
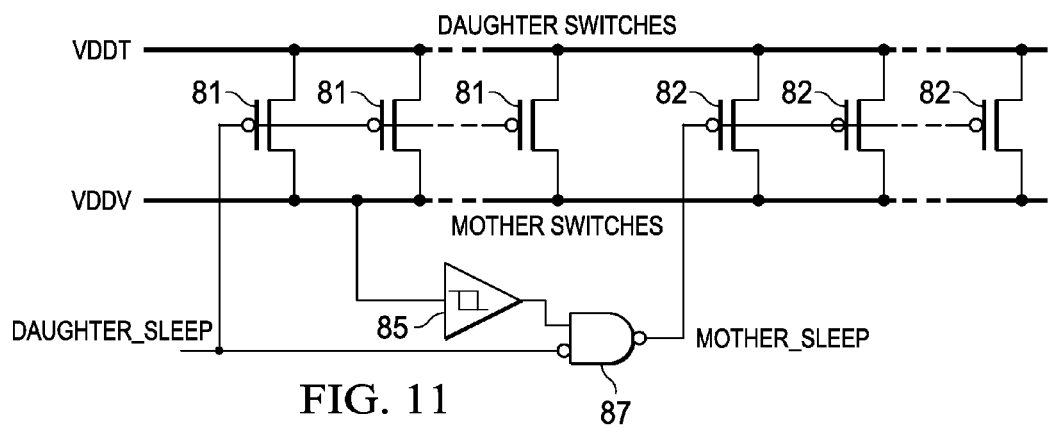
FIG. 11 depicts in another exemplary embodiment a first plurality of switches and a second plurality of switches coupled to form a circuit for supplying a virtual VDD supply responsive to a control input signal.

In alternative embodiments, several different types of power switch may be utilized, such as single input switch and dual-input switch (so-called daughter/mother switch) with various driving strengths. The embodiments are not restricted to utilize daughter switches only. FIG. 10 and FIG. 11 depict a generalized daisy-chain embodiment.

Figure 12:
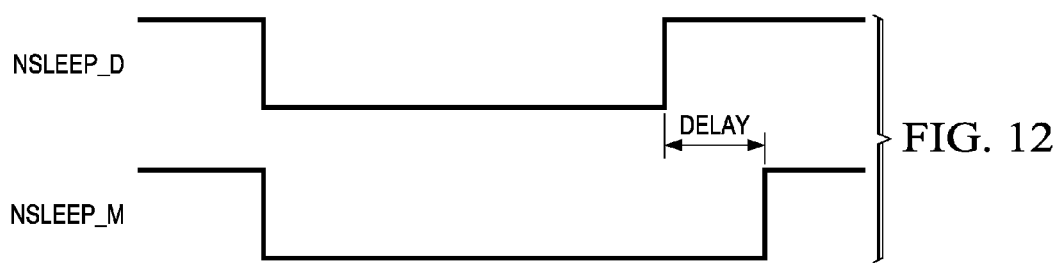
FIG. 12 depicts a timing diagram depicting the timing for the signals of FIG. 10.

In FIG. 11, another embodiment for supplying a fixed or true VDD voltage to a virtual VDD conductor for providing a controlled power up sequence is shown. In FIG. 11, a plurality of daughter switches 81 is again shown coupled serially to a control signal. A plurality of mother switches 82 is also shown, with a delay circuit formed of a Schmitt trigger 85 and AND gate 87. Each of the mother switches is associated with one of the daughter switches. In this exemplary embodiment, the Schmitt-trigger 85 is used to sense the adjusted target voltage level; it is an alternative solution to control the enable signal of mother switch (large driving strength) fabric. FIG. 12 below illustrates the associated programmable control sequence.)

In operation, the logical gate 87 prevents the "mother_sleep" control signal from transitioning to supply voltage VDDT to the corresponding part of the VDDV fabric until the voltage VDDV is already high, thus delaying the activation of the mother switches.

The use of the daughter switches and the mother switches in the exemplary embodiments may provide further advantages by controlling the switches so that, for the smaller daughter switches for example, so the daughter PMOS switches are turned on first and operated in saturation mode. Later, the larger sized mother PMOS switches are turned on but operated in the linear mode, after the virtual VDD voltage VDDV initially reaches the VDD voltage level, the mother switches operate at a lower current to continue to provide power to the virtual VDD fabric. By operating the switches in this manner, the peak current and in rush current may be mitigated, while providing a reasonable ramp up time for the virtual VDD.

FIG. 12 depicts a voltage timing diagram for an exemplary application of the circuit of FIG. 11, the sleep control input to the daughter switches is activated first, and for example about two clock cycles later, as indicated by the reference "delay" in the figure, the sleep control to the mother switches is activated. This is but one exemplary embodiment presented for illustrative purposes; and the embodiments are not limited by this example. The delay is programmable. The controller is programmable, thus in alternative embodiments the delay is adjusted to provide a proper delay to control turn on of the mother switch (large driving strength) fabric for a particular application.

Figure 13:
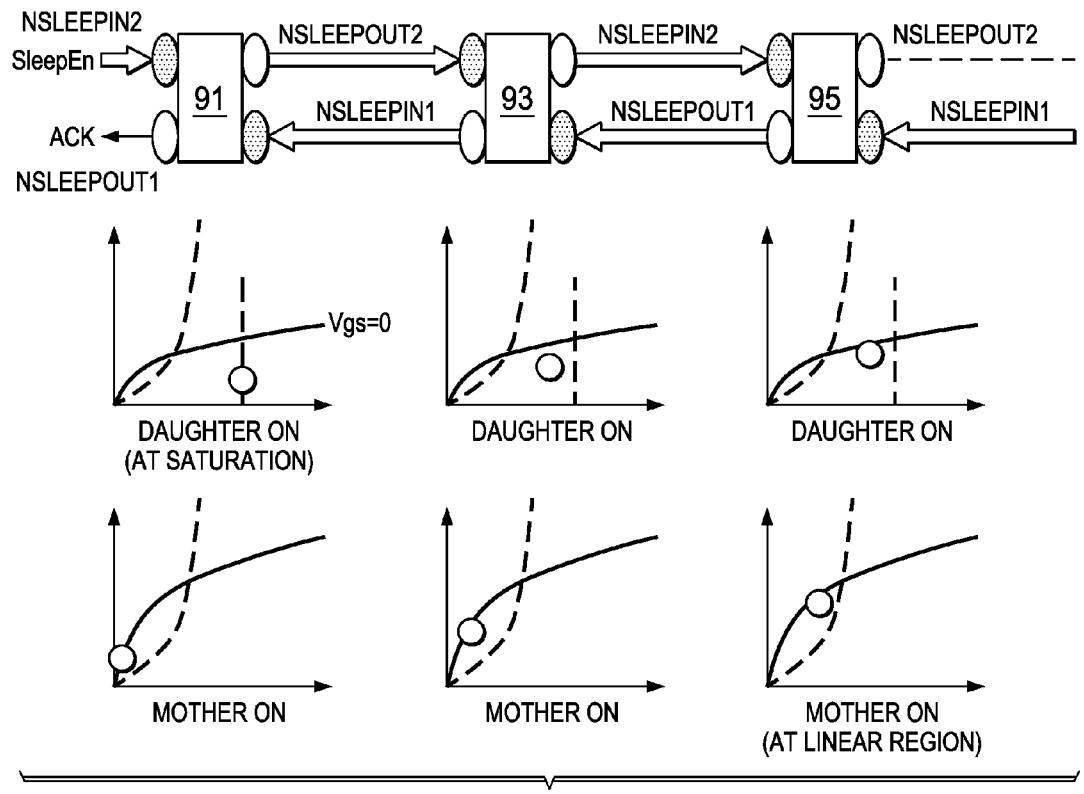
FIG. 13 depicts the in rush current control of the embodiments applied to a simple circuit diagram of a register bank for providing enable signals to chains of power switches in another exemplary embodiment.

In FIG. 13, a chain of power switches 91, 93, 95 is depicted and the current-voltage characteristics for the daughter and mother switches within the switches 91, 93, 95 is depicted for an exemplary application of the embodiments of the invention. The graphs depict as the enable signals traverse the chain of power switches, how the daughter switches turn on in a saturation mode, and later how the mother switches turn on in the lower current linear mode.

FIG. 13 depicts the principle of in-rush current control in an exemplary embodiment, wherein the dual-input switch feature of the embodiments is shown in combination with a daisy-chain configuration applied. Here the small daughter (NSLEEPIN2) switches should be turned on first, which may be operated in saturation region. Subsequently the sleep signal propagates back to the mother (NSLEEPOUT1) switches which may be operated in linear region. The associated operating points (depicted in the I-V curve) of the power switch cells, which are powered in sequence, are illustrated below.

Figure 14A:
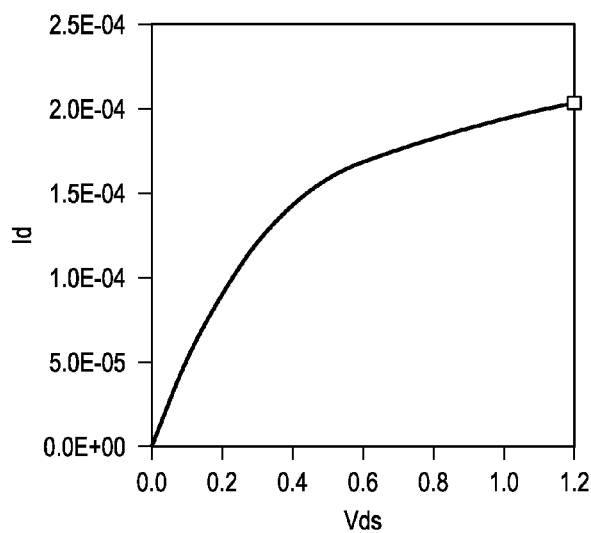
FIG. 14(a) depicts a current-voltage characteristic for a daughter switch used to provide power in an exemplary embodiment, FIG. 14(*b*) depicts a current-voltage characteristic for a mother switch used in an embodiment.
Figure 14B:
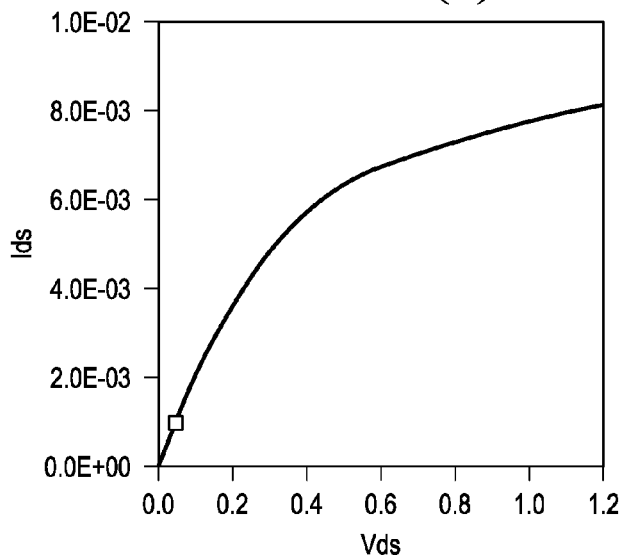

FIGS. 14(a) and 14(b) depict, for an example application, the current-voltage characteristics for typical daughter and mother power switches operated according to the exemplary method embodiment described above. The daughter switches may be operated in the saturation region. For a non-limiting example, in a semiconductor device such as an SOC, the current flowing through the daughter switch may be approximately 0.205 milliamps. The mother switch is then activated later and is operated in the linear region. In one example the current in the mother switch was observed at about 1 milliamp, with about a 10 millivolt voltage drop (Vds). This method embodiment provides advantages in mitigating the IR drop and the in rush currents, while controlling the ramp up time for the virtual VDD voltage supplied by the power switch fabric.

Figure 15:
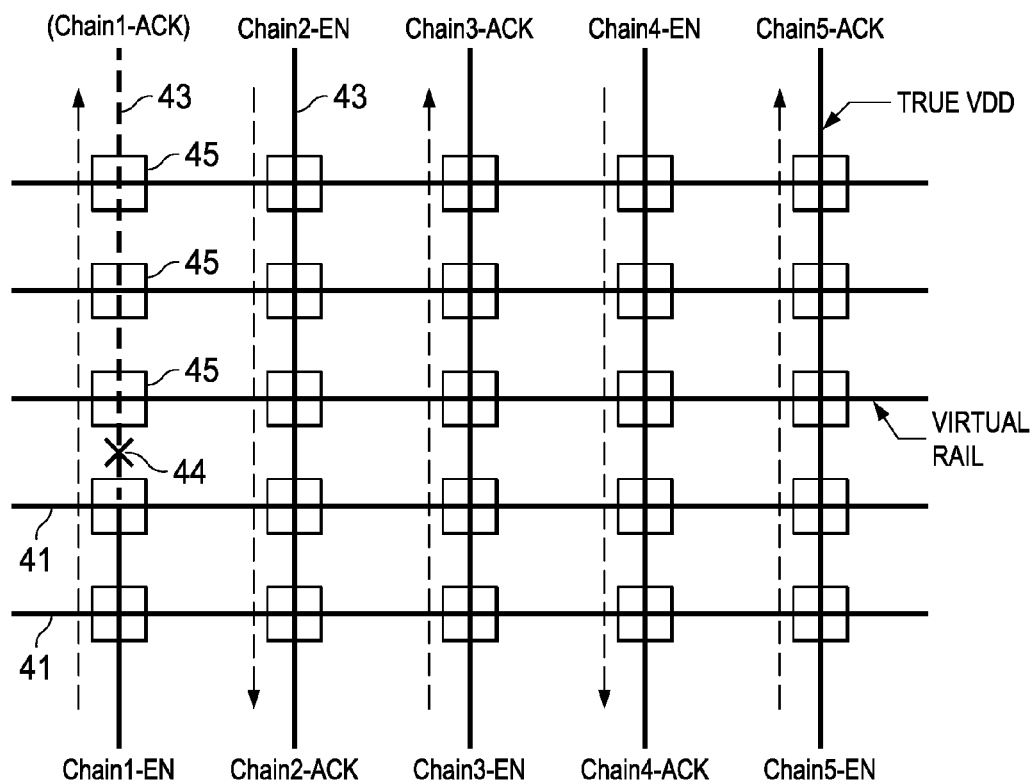
FIG. 15 depicts in yet another exemplary embodiment a power switch fabric illustrating the operation of multiple chains and switches to supply power to a virtual rail.
Figure 16:
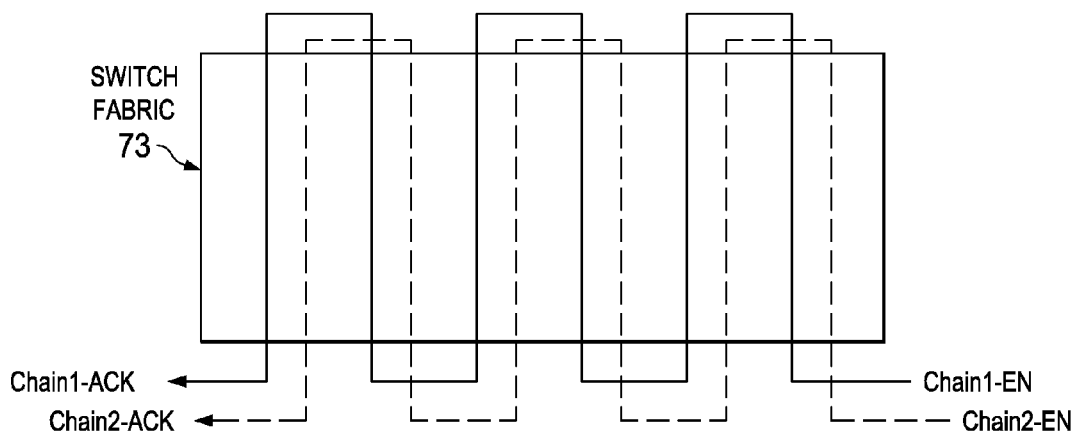
FIG. 16 depicts in another exemplary embodiment a switch fabric with at least two power switch chains in a daisy chain configuration.

FIG. 15 depicts in another exemplary embodiment of the present invention a power gating fabric. The power gating fabric distributes a virtual VDD voltage on virtual rails 41 from a true or fixed VDD voltage "True VDD" set of rails 43. A power switch 45 is placed at each intersection to provide the power on sequence. Five chains labeled Chain1-Chain5 are shown for distributing the power according to a sequence. The chains are shown interleaved to distribute the power. Chain 1 in FIG. 15 is broken as indicated by the symbol X designated 44. Because the chains of the power fabric embodiment of the invention supply power to each of the virtual rails 41 through several power switches 45, a built in redundancy, or increased reliability, is provided. Even if one of the chains is broken by a manufacturing or circuit defect, the remaining power switch chains and power switches will provide sufficient current to supply the virtual VDD rails to power each portion of the integrated circuit FIG. 16 depicts a switch fabric for a portion of an integrated circuit that may be utilized with embodiments of the present invention described above in a "daisy chain" topology. The chains of power switches and routing labeled Chain 1 and Chain 2 are provided and may be turned on at the same time, or at different times, to control the ramp up time, in rush current, peak current and power on sequence for the devices that are supplied a VDD supply by the switch fabric. Further, each chain may use multiple daughter and mother switches where the daughter switches are turned on before the mother switches, and the daughter switches are operated in saturation mode as described above. The time for turning on the two chains may be modified so that the daughter switches turn on quickly and all at once, or more slowly. Simulation tools including dynamic IR analysis of the circuit may be used to determine the timing for control signals Chain1-EN and Chain2-EN to optimize the power on sequence.

Figure 17:
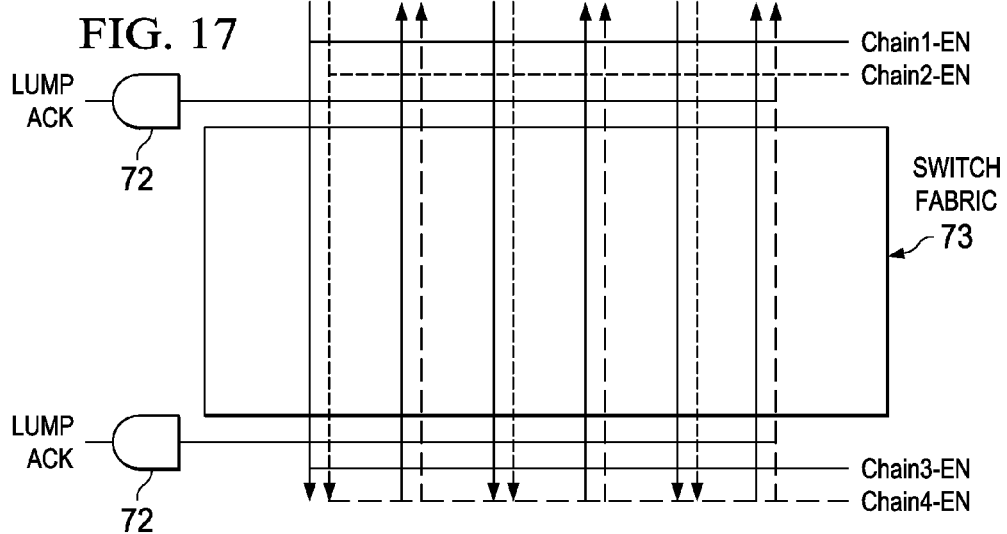
FIG. 17 depicts in another exemplary embodiment a plan view of a switch fabric having multiple chains in a fish bone configuration.

FIG. 17 depicts an alternative embodiment in which the switch fabric is used with the embodiments of the invention described above with a "fish bone" topology. In the figure the true VDD power is supplied in two locations, one where chains Chain 1 and Chain 2 begin and another where Chain 3 and Chain 4 begin. A control register of four bits (one for each of the chains 1, 2, 3, 4) is provided and the timing for supplying power to each chain may be varied as described above to optimize the power on sequence. Further the chains may include the daughter mother switches as described above with delay circuitry which turn on the mother switches only after the portion of the virtual VDD rail coupled to the mother switch reaches a VDD level. The daughter switches may be operated in a saturation mode while the mother switches are operated in a linear region. Acknowledge signals may be developed by logical gates coupled to multiple ones of the chains to detect when all of the portions have reached VDD. In alternative embodiments the Ack signals are not combined but are available as single signaling outputs.

Figure 18:
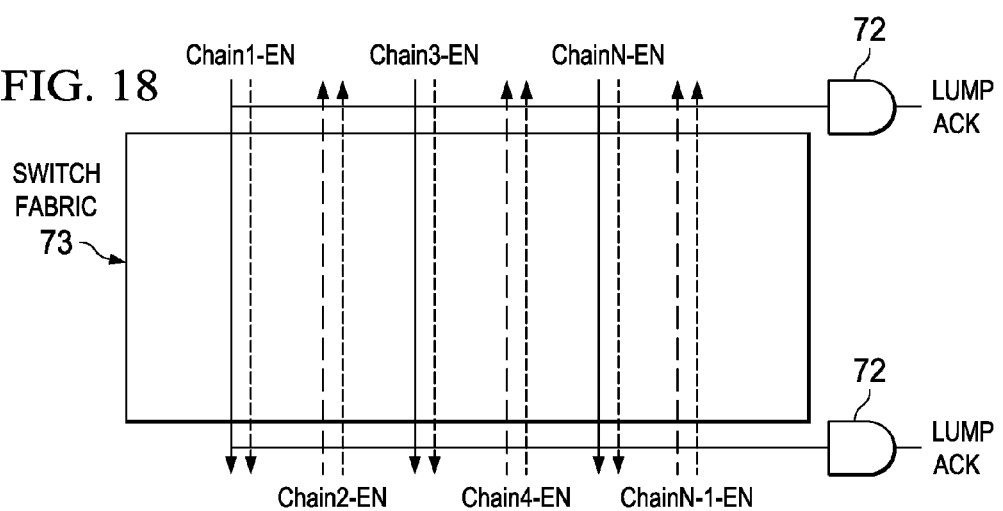
FIG. 18 depicts in yet another exemplary embodiment a power switch fabric for an SOC having N chains.

FIG. 18 depicts another alternative exemplary embodiment where the embodiments of the invention described above are applied to a switch fabric having a number of chains N. In this exemplary embodiment, the switch fabric is disposed with the routing conductors placed in an interleaved fashion, and having N root positions. As described above, the switch fabric shown may have an N bit control register, for example, to supply the enable signals. The control bits may turn on at different times and the chains may again use the daughter and mother switches, with the delay circuitry described above, to operate the daughter switches in saturation mode, and turning on the mother switches later in the linear mode of operation, to provide control of the ramp up time. Additional speed up of the ramp-up time is possible by using the controls of the embodiments to turn on several chains simultaneously once the virtual rail is charged to the normal operating voltage. This additional speed up feature is another advantage of programmable power-up sequence control provided by the embodiments.)

The device performance is further increased, in alternative preferred embodiments, by the use of a wider DESL and N-Well layer enclosure. The dummy polysilicon layers are available for vertical interconnect. In a preferred integrated circuit layout using the standard cells, dummy polysilicon is aligned and placed in the vertical directions and between rows of cells in the horizontal and vertical directions, to isolate external layout effect impacts.

Although the present invention and its advantages have been described in detail, it should be understood that various changes, substitutions and alterations can be made herein without departing from the spirit and scope of the invention as defined by the appended claims. For example, it will be readily understood by those skilled in the art that the methods may be varied while remaining within the scope of the present invention.

Moreover, the scope of the present application is not intended to be limited to the particular embodiments of the methods and steps described in the specification. As one of ordinary skill in the art will readily appreciate from the disclosure of the present invention, processes, or steps, presently existing or later to be developed, that perform substantially the same function or achieve substantially the same result as the corresponding embodiments described herein may be utilized according to the present invention. Accordingly, the appended claims are intended to include within their scope such processes or steps.

What is claimed is:

1. An apparatus for providing a virtual power supply to a circuit portion of an integrated circuit, comprising:
   a plurality of power switches coupled in at least two independent chains between a plurality of VDD conductors coupled to a power supply and virtual VDD conductors providing the virtual power supply, having control signals coupled in sequence to an enable signal to sequentially turn on;
   the plurality of VDD conductors disposed over the circuit portion and arranged in parallel to one another and extending in a first direction;
   a plurality of the virtual VDD conductors disposed over the circuit portion arranged in parallel to one another and extending in a second direction different from the first direction and intersecting at least two of the VDD conductors, each of the plurality of virtual VDD conductors coupled to at least two of the power switches coupled in at least two independent chains; and
   an enable control circuit providing enable signals to the chains at predetermined times;
   wherein the virtual power supply is provided on the virtual VDD conductors coupled to each of the power switches, and the power switches in the independent chains are configured so that the virtual VDD conductors may receive the virtual power supply even if a break in one of the independent chains occurs, and the portion of the circuit is powered on by enabling the power switches.

2. The apparatus of claim 1, and further comprising:
   wherein a power switch is provided at an intersection of each one of the plurality of VDD conductors and a virtual VDD conductor.

3. The apparatus of claim 1, and further comprising:
   at least one root location providing the power supply to one or more of the chains.

4. The apparatus of claim 3 wherein there are multiple root locations.

5. The apparatus of claim 1, wherein each of the independent chains comprises a chain of daughter switches and a chain of mother switches, each of the mother switches corresponding to one of the daughter switches.

6. The apparatus of claim 5 wherein each of the mother and the daughter switches comprises a PMOS transistor having its current conduction path coupled between the power supply and the virtual power supply and having a gate signal coupled to an enable signal.

7. The apparatus of claim 5 wherein the daughter switches are enabled to provide a power up sequence applying the power supply to the virtual power supply, and the mother switches are enabled at a later time to provide additional current to the virtual power supply.

8. The apparatus of claim 7, wherein the mother switches have their enable signals coupled to the enable signals of the corresponding daughter switches and to a gating circuit that enables the mother switches only after the virtual power supply reaches a threshold voltage.

9. The apparatus of claim 8 wherein the threshold voltage is approximately equal to the power supply voltage.

10. The apparatus of claim 1 wherein the switches comprise PMOS transistors having their current conduction path coupled between the power supply and the virtual power supply and their gate signal coupled to an enable signal.

11. An integrated circuit having at least one circuit coupled to a gated virtual power supply, comprising:
at least one pad for receiving an external power supply;
a circuit portion that has active and inactive modes which is coupled to the gated virtual power supply;
a control circuit providing a plurality of enable signals to apply the external power to the virtual power supply; and
a power switch fabric, further comprising:
a plurality of VDD conductors coupled to the external power supply and arranged in parallel and extending in a first direction overlying the circuit portion;
a plurality of virtual VDD conductors arranged in parallel and extending in a second direction different from the first and overlying the circuit portion, each of the virtual VDD conductors intersecting the VDD conductors; and
a plurality of power chains coupled to supply virtual VDD conductors with the gated virtual power supply to the circuit portion, each power chain comprising a plurality of power switches coupled between the VDD conductors and the virtual VDD conductors and the power switches coupling each of the virtual VDD conductors to at least two of the power chains responsive to one of the enable signals, wherein the virtual VDD conductors may receive the gated virtual power supply even if one of the power chains is broken.

12. The integrated circuit of claim 11 wherein a power switch is disposed at the intersections of the VDD conductors and the virtual VDD conductors.

13. The integrated circuit of claim 12 wherein a break in a chain of the power switch fabric does not break the virtual power supply.

14. The integrated circuit of claim 11 wherein each of the power switches comprises a PMOS transistor having its current conduction path coupled between the power supply and the virtual power supply, and having a gate signal coupled to an enable signal.

15. The integrated circuit of claim 11 wherein one of more of the power chains further comprises a plurality of daughter switches and a plurality of mother switches, the mother switches being enabled at a time after the daughter switches are enabled.

16. The integrated circuit of claim 15, wherein the mother switches further comprise a MOS transistor biased to conduct in linear mode and wherein the daughter switches further comprise a MOS transistor biased to conduct in saturation mode.

17. A method for providing a virtual power supply to a portion of a circuit, comprising:
providing a plurality of VDD conductors coupled to a power supply and arranged in parallel and extending in a first direction and overlying the portion of the circuit;
providing a plurality of virtual power conductors arranged in parallel and extending in a second direction different from the first direction and overlying the portion of the circuit to supply the virtual power supply;
arranging a plurality of power switches coupled between the VDD conductors and the plurality of virtual power conductors in switch fabric chains independently enabled in response to at least two enable signals;
providing a control circuit for supplying the at least two enable signals; and
the plurality of power switches being arranged so that each one of the plurality of virtual power conductors intersects at least two of the VDD conductors and is coupled to at least two of the switch fabric chains, so that each of the virtual power conductors may receive the power supply even if one of the independently enabled switch fabric chains is broken.

18. The method of claim 17 and further comprising:
for each of the chains, arranging a first plurality of power switches as daughter switches and a second corresponding plurality of switches as mother switches, the mother switches being enabled at a time after the corresponding daughter switch is enabled.

19. The method of claim 18 wherein the enable to a mother switch is further gated by a delay circuit that enables the mother switch only after the virtual power supply reaches a predetermined threshold voltage.

* * * * *